Figure 1:
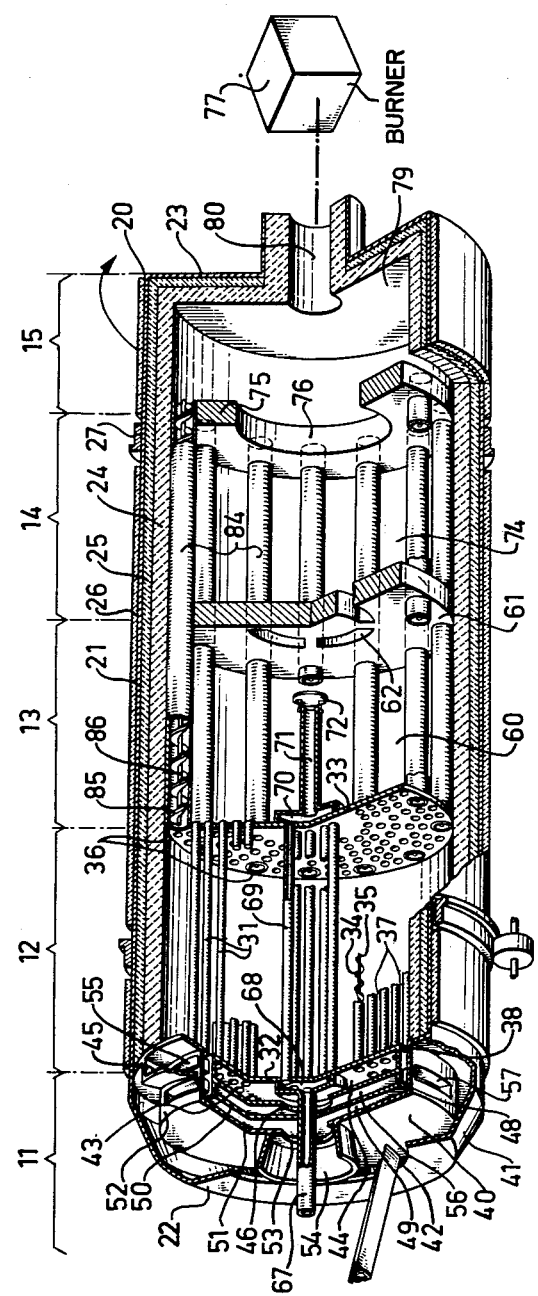

United States Patent Office 3,039,753
Patented June 19, 1962

3,039,753
ROTARY FURNACE WITH TUBULAR HEAT EXCHANGER AND METHOD FOR HEAT EXCHANGE
Sven Gustaf Harald Eketorp and Sven Hjalmar Backström, Borlange, and Bo Michael Sture Kalling, Djursholm, Sweden, assignors to Stora Kopparbergs Bergslags Aktiebolag, a company of Sweden
Filed May 15, 1959, Ser. No. 813,455
Claims priority, application Sweden May 16, 1958
18 Claims. (Cl. 263—33)

The invention relates to a method and apparatus for treating comminuted solid materials at high temperature, and it is more particularly concerned with the recovery of heat from the hot treated solids for preheating the solids to be treated. In many chemical and metallurgical processes carried out at high temperatures and also in other heat treatments of materials the heating of the material to the requisite temperature constitutes a very considerable and often the predominant part of the total energy demand.

It is one object of the invention to provide a method and apparatus for exchanging heat between a comminuted relatively hot solid material and a comminuted relatively cold solid material by which the uncombined heat of the hot material can be more effectively recovered than in methods and apparatus hitherto known. In its more advanced performances the invention aims at so complete a recovery as to make it necessary to supply from extraneous source only very little heat in addition to that required for covering the convection and radiation losses to the surroundings. It is another object of the invention at the same time to recover heat from gases evolved in the chemical or metallurgical process or heating gases used in the processing step. A still further object is to devise a heat exchanger for the present purpose and also a combination of heat exchanger and processing chamber which may be assembled of simple standard elements which are cheap and easy to replace.

For obtaining these objects and other advantages easily understood by those skilled in the art a heat exchanger is used which comprises a rotary drum located with its axis substantially horizontally and having its ends closed by end plates and having a plurality of tubes fitted in parallel to said axis between said plates to form passageways for one of the heat exchanging materials from the one end of the drum to the other, inlets and outlets being provided in or near said end plates for passing the other of the heat exchanging materials in the interspace between said tubes countercurrently to the material in the tubes, the material being filled up to such level in the interspace of the drum as to cause each tube to be completely surrounded by the solid material at least during a part of each revolution of the drum.

Preferably the device is so constructed that the material to be heated is fed through the heat exchanger inside the tubes, while the hot material is fed in an opposite direction outside the tubes, the heat of this material being successively transmitted to the incoming material through the tube walls. In order to establish a proper and easily adjustable travelling speed of the material through the tubes, these are suitably provided with internal propelling means, such as fins or screws, which in the rotation of the furnace promote the feed of the material. Of course the heat exchanging procedure may also be carried out in such a way that the incoming material is fed outside the tubes and the outgoing material is caused to pass inside the tubes, but this modification is as a rule not to be recommended.

In another preferred embodiment a processing chamber or furnace is closely connected to the heat exchanger at the one end thereof so that the material preheated in the heat exchanger in the tubes or in the interspace therebetween, as the case may be, will be discharged into the processing chamber, either at the end of the chamber adjacent to the heat exchanger or through special passage ways to the remote end of the chamber. The material treated in the chamber is then passed as heating material to and through the heat exchanger.

As usually extraneous heat is supplied to the processing chamber in the form of heating gases, such as burning producer gas or gas from an oil burner, it is practical according to the invention to introduce such gases after use, i.e. the waste gases, into the heat exchanger and let them pass that space thereof where solid material is transported to the processing chamber and in direct contact therewith, in order that also these waste gases shall preheat the solid material in countercurrent passage. This holds good also for gases developed in the process.

The invention will now be described more in detail with reference to the accompanying drawings, only by way of examples to which it is not limited.

Figure 2:
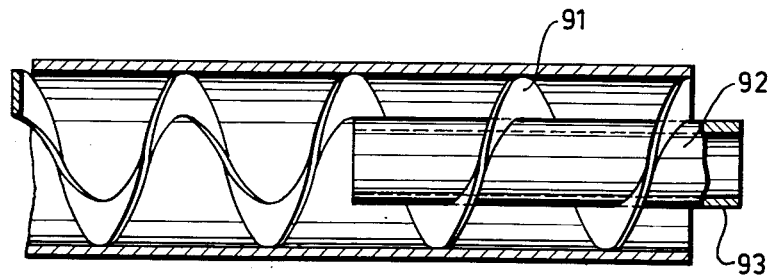
Figure 3:
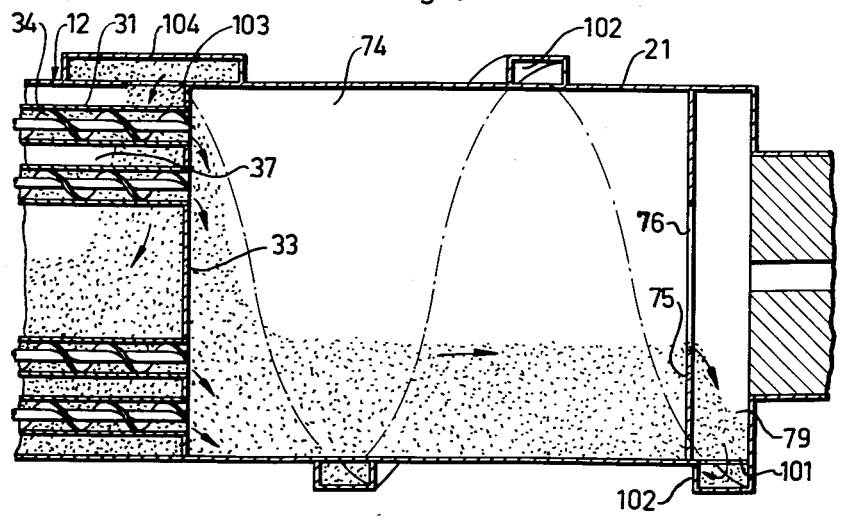
Figure 4:
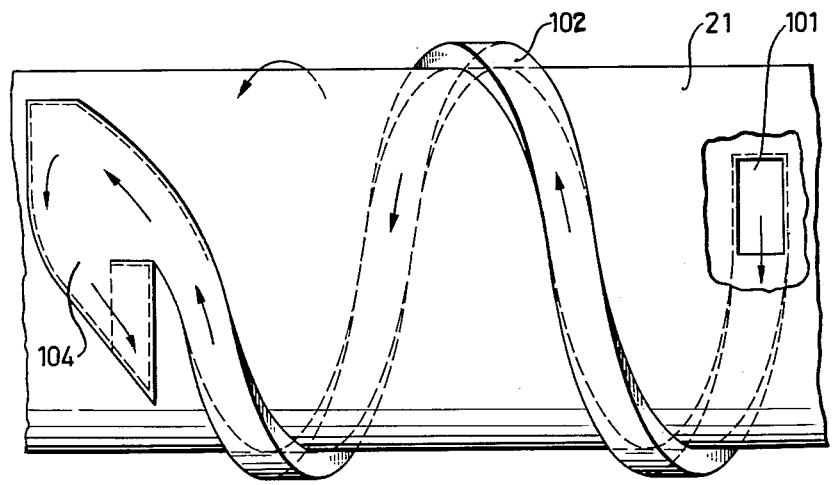
Figure 5:
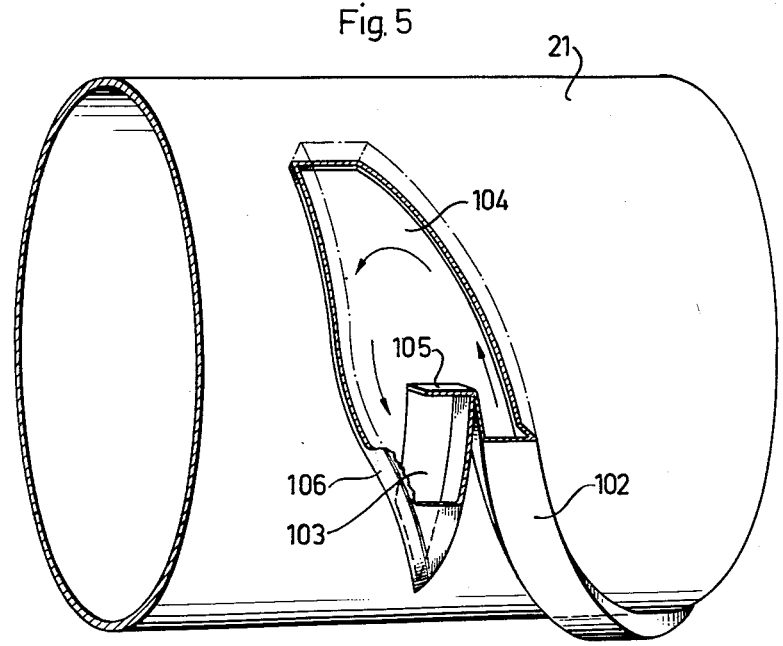
Figure 6:
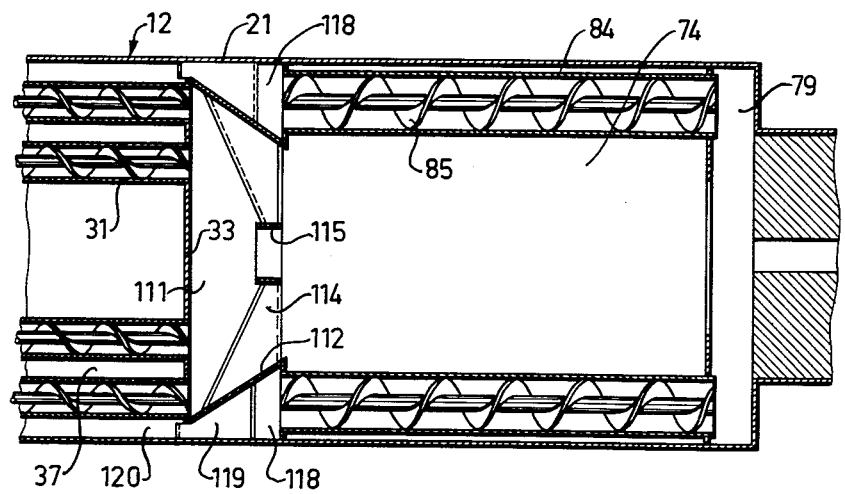
Figure 7:
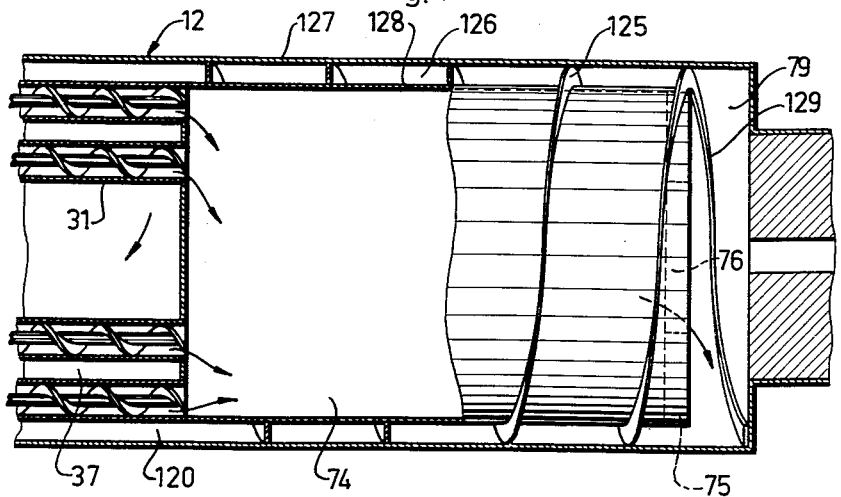

In the drawings:

FIG. 1 is a perspective sectional view of a heat exchanger-furnace structure according to the invention; FIG. 2 illustrates a detail of propelling means in tubes; FIG. 3 is a diagrammatic sectional view of an alternative embodiment with an outer helical return channel; FIGS. 4 and 5 illustrate details of the return channel of FIG. 3; FIG. 6 is a diagrammatic sectional view of a further embodiment much like that of FIG. 1 but with special means for the material transfer between the heat exchanger and the processing section; and FIG. 7 is a diagrammatic sectional view of a still further embodiment in which hot material is returned to the heat exchanger through a cylindric space surrounding the processing chamber.

The furnace structure illustrated in FIG. 1 comprises five sections, a charging and discharging structure 11, a heat exchanger 12, a processing furnace consisting of a preheater department 13, a processing chamber 14, and a recharging chamber 15. The entirety of sections is enclosed in a shell 20 of metallic material, such as iron sheet, comprising a cylindrical portion 21, a front end portion 22, and a rear end portion 23. In the four last mentioned sections, exposed to high temperatures, the shell has a refractory inside lining 24, separated from the metallic shell by a heat insulating layer 25, and an outside insulating layer 26, leaving annular open spaces for travelling rings 27 by which the furnaces structure rests on rollers so as to be rotated by the action of one or more of the rollers in conventional way.

The heat exchanger section 12 consists of a nest of horizontal tubes 31 fitted between and carried by a front end plate 32 and a rear end plate 33. Each tube has inner material propelling means in the form of a feeder screw 34 secured to a rod or pipe 35 and snugly fitting the wall of the pipe so as to become immovable relative to the pipe. Through openings 36 in plate 33 hot material is fed into the interspace 37 between the tubes 31 from the processing and recharge sections as will be described later. In this case an annular peripheral opening 38 is provided in end plate 32 to form an outlet from the interspace 37.

The vertical front end plate 32 of the heat exchanger forms together with the front end cover 22 of the shell and a small portion of the cylindrical portion 21 thereof a material charging chamber 40, which has a conical outer portion 41 and a central charging opening 42. In the chamber is a vertical partition wall 43 forming with plate 32 a distributing chamber 44. A screw or shovel 45 near the periphery of chamber 40 promotes the feed of the material into the chamber 44 from where it is distributed and fed into the tubes 31. The material may rise in chamber 44 almost up to the centre where there is an opening 46 in wall 43 connecting chamber 44 through interspace 56 and ducts 57 with the outer or proper chamber 40 so that excess of material will be recirculated.

The opening 38 in end plate 32 opens into an annular channel 48 which, in turn, opens into a discharge chamber 49 formed by two vertical plates 50 and 51 and a cylindrical portion 52, the plate 51 having a central discharge opening 53 and a collar 54 surrounding the latter. In the channel 48 communication is established between chamber 44 and the peripheral portions of chamber 40 through a passage 55 where shovel 45 terminates. Similarly communication is established between the space 56 formed by wall 43 and plate 50 and the peripheral portion of chamber 40 through four ducts 57 through the channel 48.

The tubes 31 open into the preheating chamber 60 of preheater 13. This chamber is defined by the rear end plate 33, the refractory partition wall 61, and the lining 24. Openings 62 in wall 61 form communication with the processing chamber or furnace 14 and the radial location of the openings determine the level of goods in the chamber 60. Air may in this case be supplied through a pipe 67 to a small distributor chamber 68 at the outside of the front end plate 32, and a plurality of airpipes 69 connect this chamber with an air collecting chamber 70 at the outside of the rear end plate 33 and pass through the heat exchanger whereby the air is preheated. There is connected to chamber 70 an air pipe 71 having a nozzle 72 for supplying air for burning combustible gases which may enter through openings 62. In case extraneous combustible gases are to be used for the preheater they may be passed through the pipe system 67—72 instead of or, by duplicating the system in addition to the air.

The processing chamber 74 of section 14 is defined vertically by the refractory walls 61 and 75, the latter having a more or less wide central opening 76 defining the level of goods in the chamber. Through this opening processing gas, such as heating gas may be supplied from the extraneous source 77 which may be a gas producer or an oil burner or the like.

The recharging section 15 comprises a return chamber 79 between wall 75 and the rear end wall 23. In the latter there is a central opening 80 through which the heating gas from source 77 or any other processing gas may be supplied. Return tubes 84 having interior propelling means for comminuted solids, here in the form of a feed screw 85 secured to a rod 86, are arranged in spaced relationship at the peripheral portions of the preheating and processing sections 13 and 14 to connect the return chamber 79 with the interspace 37 of the heat exchanger through the openings 36 in the rear end plate 33. The direction of twist of screw 85 is obviously opposite to that of screw 34. The width of tubes 84 is with advantage greater than that of the tubes 31 of the heat exchanger.

In operation of the apparatus shown in FIG. 1 finegrained or at least crushed material, such as iron ore, is fed through opening 42 into the charging chamber 40 where the shovel 45 collects material at the bottom of chamber 40 as the apparatus rotates. During the further rotation the material is forced through passage 55 in the channel 48 so as to enter the distributing chamber 44 which may be filled right up to the overflow opening 46. It should be observed that according to the speed of rotation the material will in all parts of the cylindric apparatus occupy a space more or less deplaced to the rising side thereof. From chamber 44 the still cold material passes through tubes 31 propelled by the feed screws 34 therein and is emptied in preheated state into the preheating chamber 60 which will be filled up to a level defined by openings 62. In this chamber the material will be further preheated by the combustion of gases from chamber 74 by the air supplied through the pipe system 67—72. The preheated material is now processed in chamber 74, for instance by being further heated by heating gas from apparatus 77 or by being reduced with producer gas from apparatus 77 if the material is, for instance, iron ore, which shall be reduced. Generally any heat treatment may be carried out in this chamber. The hot treated material overflows the threshold formed by the opening 76 in wall 75 and accumulates in the recharge chamber 79 from where it is transported by the return tubes 84 and the feed screws 85 therein to the interspace 37 of the heat exchanger which may be filled up almost to the centre so that in the rotation of the apparatus the tubes 31 will be thoroughly dipped into the hot material in order that the heat transfer shall be much effective. The hot material travels successively from the end of entrance towards the front end where it is discharged in cooled state through the channel 48 into discharge chamber 49 which will be filled up to a level defined by exit opening 53 through which the cold treated material is removed from the apparatus. At the same time hot waste gases pass from chamber 60 through the tubes 31 countercurrently to the solid material travelling therein and in direct contact therewith and pass further through chamber 44 and via passage 55 or opening 46 and the ducts 57 to chamber 40 and escape through opening 42 in cooled state.

It should be understood that the apparatus described can with small alterations be rotated in the direction opposite to that assumed in the drawing. If, for instance, in the apparatus of FIG. 1 shovel 45 is removed and opening 42 is made very much wider the material transport can be reversed.

It has been found that the material in the tubes 31 and possibly tubes 84 is not easily emptied because the bulk of material outside the tube openings counteract the discharge. Therefore small wings may be fitted on the end plate, preferably at the rotationally frontal side of the openings so that material may be removed more or less just at the openings when they pass through the material. It is also possible to use an arrangement shown in FIG. 2 where the feed screw consists of a helical strip 91 secured to the tube wall and a piece of pipe 92 is inserted into the free space in the centre of the strip screw 91 leaving a portion 93 outside the end of the tube. The pipe should preferably be inserted to a depth at least equal to the diameter of the tube and project a distance of at least one fourth of the tube diameter. It is suggested to use a pipe because its opening will facilitate the passage of gases into the tube. The pipe 92 may in some cases be replaced by a plug. The following figures illustrate the usefulness of such a pipe: Feeding sand in a 2½″ tube. Pitch $1 \times d$, width of screw flank ½r. Speed 11 r.p.m.

Capacity kg./h.
(1) Discharging towards a material level=0, that is, furnace empty_____ 17.9
(2) Discharging towards a full furnace, so that the material reaches over the tube_____ 2.5
(3) Same as 2, but with a pipe inserted into the central opening of the tube_____ 14.1

The feed screw should be so placed in the tube that in rotation of the furnace the material is dumped from the tube on that part of the turn when the tube lies above the level of material.

Since it is of great importance for the invention that the material is properly fed in the tubes experiments have been made with tubes of the type illustrated in FIG. 2. By varying the factors tube diameter ($d$), pitch of the screw, width of the strip and speed of rotation (revolutions per minute), the transport capacity (kilograms per hour) may be varied within wide limits. This will appear from the following table of results from experiments with sand having a volume weight of 1.4 kilograms per liter.

| Tube diameter d, inch | Pitch | Width of strip | Rotational speed, r.p.m. | Capacity, kg./h. |
|---|---|---|---|---|
| 2 | 3d | ½r | 11 | 3.42 |
| 2½ | 3d | ½r | 11 | 8.91 |
| 3 | 3d | ½r | 11 | 16.50 |
| 2½ | 1d | ½r | 11 | 18.75 |
| 2½ | 2d | ½r | 11 | 11.73 |
| 2½ | 3d | ½r | 11 | 8.91 |
| 2½ | 3d | ½r | 11 | 8.91 |
| 2½ | 3d | ¾r | 11 | 11.28 |
| 2½ | 1d | ½r | 4 | 6.24 |
| 2½ | 1d | ½r | 5 | 7.71 |
| 2½ | 1d | ½r | 7 | 11.07 |
| 2½ | 1d | ½r | 9 | 14.73 |
| 2½ | 1d | ½r | 11 | 18.75 |

FIGS. 3 to 5 illustrate an alternative way fo returning the material from the return chamber 79 to the heat exchanger 12. The material to be treated in the processing chamber 74 (no preheating section being provided in this case) is passed through the heat exchanger by tubes 31 having a transport screw 34 and the material treated passes through the opening 76 of partition wall 75 into the return chamber 79. From there the material passes through an aperture 101 in the cylindrical portion 21 of the shell and enters a channel 102 running helically on the outer surface of the shell 21 and opening ultimately through aperture 103 into the interspace 37 of the heat exchanger. Due to the rotation of the drum, the direction of rotation and gravity the material, tending to occupy the lowest portions of the channel, travels in the latter towards the heat exchanger as indicated by the arrows. A special arrangement, illustrated more in detail in FIGS. 4 and 5, warrants a proper discharge into and a sufficiently high level of material in the heat exchanger. The end portion of the channel is shaped like a pocket 104, which is shown in detail in FIG. 5. This pocket causes the material to change its direction of travel when the pocket has passed the lowermost position during the rotation and thereby the material is dumped from the channel through aperture 103 into interspace 37 at the moment when the pocket is above the level of the material. In order to prevent the material from flowing back to the channel from the interspace 37 too easily, the material transport is obstructed in this direction, in part by the wall 105, in part by the lateral feeding-in along the wall 106.

The embodiment illustrated in FIG. 6 is peculiar in the transfer of material from the heat exchanger 12 to the processing chamber 74 and from the recharge chamber 79 to the heat exchanger. The tubes 31 for material to be preheated open into an intermediary chamber 111 defined by the heat exchanger end plate 33 and a peripheral conical wall 112. In this chamber a plurality, such as four, plates 114 are secured to the wall 112 and a central ring 115 so as to form an acute angle to the axis of the drum. These plates will scoop away material from chamber 111 into chamber 74 so as to lower the level in front of the openings of tubes 31, thus facilitating the discharge from the tubes. Between the wall 112 and the cylindrical portion 21 of the apparatus a return feed space 118 is formed to receive return material from the tubes 84. Shovels 119 are arranged in this space at acute angles to the axial direction so that the material fed into the space by screw 85 will be shovelled into the interspace 37 at the extreme peripheral portion 120 thereof. Therefore by a greater portion of the cross-sectional area of the heat exchanger will be given to the tubes. It is to be understood that each of these means, the scooping plates 114 and the shovels 119, may be used separately. It is also possible to use a screw in the chamber 111 similar to those in the tubes.

The alternative return feed structure shown in FIG. 7 consists of a large feed screw 125 fitted in the annular return space 126 arranged along the cylindrical wall 127 of the apparatus between that wall and an inner furnace shell 128, which may be provided with a refractory lining at its inner surface. As in previous embodiments, tubes 31 in the heat exchanger 12 transport material to be preheated and discharge into the furnace chamber 74. The material passes then to the chamber 74, overflows the ring-like wall 75 and reaches the recharge chamber 79. Here, due to the rotation of the apparatus, the end portion 129 of the screw 125 catches the material and scoops it into the space 126 where the screw feeds it along the bottom portion of space 126 to the peripheral portion 120 of the interspace 37 of the heat exchanger.

The principle described above for heat exchanging between solid materials may be utilized for many purposes. The simplest case is when the material alone, with or without additives, is to be heated to a certain temperature for a certain time. In this case the necessary fuel may be completely burnt before entering the furnace, for which reason no secondary air need be added. This is of course also true when the heating is performed by means of an electric current.

In, for instance, magnetizing roasting of iron ores, where non-magnetic iron oxide is to be transformed into a magnetic state by reduction with a reducing gas or by means of the addition of carbon, a considerable fuel saving will be gained if the reaction gas is burnt in separate combustion chamber as in the example illustrated in FIG. 1. It is extremely important in this case that the calorie need of the process is low, which is possible to attain by the method disclosed.

The following example may be referred for showing the result obtained in carrying out a magnetic roasting in the combination described above of a heat exchanger, combustion zone and reaction zone.

A rotary furnace having an inner diameter of 750 mm. and a heat exchanger length of 1.3 m., a preheating chamber length of 1.0 m. and a reaction chamber length of 1.7 m. was charged with hematite ore of the normal Mid-Swedish type containing 45% Fe. The ore was crushed to less than 1 mm. lump size and was supplied in a quantity of 500 kg./h. The temperature of the incoming material right after the heat exchanger was 580° C. and by the exhaust gas from the reaction chamber being burnt with secondary air the material temperature was elevated to 700° C. at the entrance to the reaction chamber. At the far end of the reaction chamber, before leaving the furnace, the material had a temperature of 750° C. The furnace was supplied with gas from an oil vapourizer with a gas temperature of 1200° C. The temperature of the outgoing material was 125° C. and that of the flue gas was 115° C. The oil consumption was equivalent to a calorie need of only 130,000 kcal./ton incoming ore. After the reducing treatment the ore was crushed to less than 0.2 mm. lump size and separated in a dry-magnetic separator. An iron concentrate with 67.5% Fe and a non-magnetic waste of 4.0% Fe were obtained, which corresponds to a Fe-yield of 96.8%.

In the above specification reference has been made to a cylindric space in which heat exchange is performed. It is, of course, to be understood that the term cylindric will also comprise equivalent shapes of the space the peripheral wall or limitation of which is located symmetrically with regard to a central axis of rotation of the apparatus.

It is interesting that in the present apparatuses also the heat of the waste gases can be effectively recovered by passing them through the tubes in the heat exchanger when the material to be heated is passed through them. As indicated above various modifications can be adapted in this heat exchange when there is a feeder screw in the tube. The screw may be wound round a rod so that the gas is compelled to travel helically through the tube, but the rod may be interrupted at one or more places so that the gas will get a short cut through the centre of the screw. If a pipe is used instead of the rod the gas can be brought at least partly to pass through the pipe and thus indirectly give off its heat to the solid material. Also the pipe may be interrupted at one or more places to bring about a direct contact between the gas and solid material. It is obviously possible to vary within wide limits the heat exchanging conditions.

What is claimed is:

1. Method for exchanging heat between a comminuted relatively hot solid material and a comminuted relatively cold solid material within a substantially cylindrical space the axis of which is substantially horizontal, comprising positively transporting the one of said materials from one end to the other end of said cylindrical space in a plurality of distinguished streams substantially parallel to the axis of said cylindrical space, passing the other of said materials from the latter end to the first end of said cylindrical space in the interspace between said distinguished streams and counter-currently to the material therein, and rotating the entirety of said distinguished streams about the axis of said cylindrical space so as to cause each portion of the material in said interspace to come into close heat exchanging contact with a plurality of said streams.

2. Method as claimed in claim 1 comprising supplying the comminuted solid material which is passed in the interspace between said streams to said interspace in quantity sufficient ot fill up said interspace to a level sufficient to completely surround each of said streams during at least a portion of each revolution of said entirety of streams.

3. Method as claimed in claim 2, in which the majority of said streams are positioned nearer to the periphery than to the centre of said cylindrical space.

4. Method as claimed in claim 1 in which the material which is passed in said plurality of distinguished streams is fed thereto as a cold material and is preheated therein, passing the resulting preheated material to and treating it in a processing zone so as to further heat it and the resulting further heated material is the material that is passed counter-currently in the interspace between said distinguished streams.

5. Method as claimed in claim 4 which comprises passing the material which is delivered to said processing zone axially therethrough from the end thereof adjacent to said other end of said cylindrical space to the end thereof remote from said other end of said cylindrical space and returning said material from said remote end of said processing zone to said other end of said cylindrical space.

6. Method as claimed in claim 4 comprising passing hot gases present in said processing zone including gases introduced into and developed in said zone through said cylindrical space in direct contact with and counter-currently to said cold material being preheated in said space.

7. An apparatus for heat treating comminuted solid materials comprising a heat exchanger defined by a peripheral wall located substantially symmetrically about a central axis of rotation of the heat exchanger, means for rotating said heat exchanger around said axis, a front end plate and a rear end plate each provided with a plurality of openings, a plurality of tubes being mounted between said end plates in communication with said openings and substantially parallel with said axis, propelling members in said tubes arranged to facilitate the transport of the solid material through the tubes, an interspace in the heat exchanger between said tubes, communication ducts in connection with said end plates including openings therein for the introduction and discharge of comminuted material into and from said interspace, the discharge ducts being arranged to maintain such a level of comminuted material in said interspace that during rotation of the heat exchanger about said axis of rotation each of said plurality of tubes will come completely below said level during at least a portion of each revolution of the heat exchanger.

8. An apparatus as claimed in claim 7 in which said propelling members in said tubes comprise screw-shaped inserts.

9. An apparatus as claimed in claim 8, in which the propelling members are positioned in such a way that when the heat exchanger is rotating the material is discharged from each tube during that part of the rotation where said tube lies above the material level at the discharge end thereof.

10. An apparatus as claimed in claim 8 comprising a pipe inserted into the central part of each insert at the discharge end of the tube, a portion of said pipe at least equal to one fourth of the tube diameter, projecting outside the tube end.

11. An apparatus as claimed in claim 7 comprising a processing furnace, said heat exchanger being attached at its rear end to said processing furnace, means being provided in said furnace to receive from the heat exchanger material preheated therein and means to return to the heat exchanger hot material to pass the latter counter-currently to said preheated material.

12. An apparatus as claimed in claim 11 in which said means to return hot material to said heat exchanger comprises tubes connecting the remote end of the processing furnace with the heat exchanger and screw-shaped inserts in said tubes adapted at the rotation of said furnace to convey material from or to the heat exchanger to or from the remote end of said furnace, respectively.

13. An apparatus as claimed in claim 11 wherein the means to return the material comprises a screw-shaped channel adjacent to the external wall of the furnace connecting the remote end of the furnace with the heat exchanger.

14. An apparatus as claimed in claim 13 in which said furnace has an outer cylindrical wall and spaced therefrom an inner cylindrical wall, an annular space being formed between said walls, a helical strip in said annular space arranged to form a large feeder screw said outer and inner walls and helical strip forming said screw-shaped channel.

15. An apparatus as claimed in claim 7 comprising a processing chamber having a front end and a rear end, said processing chamber being attached at its front end to said heat exchanger at said rear end plate, a recharge chamber at the rear end of said processing chamber, an intermediary chamber in said processing chamber defined by said rear end plate and a peripheral conical wall and a plurality of plates in said intermediary chamber obliquely positioned therein so as to promote the feed of comminuted material from said rear end plate towards the rear end of said processing chamber.

16. An apparatus as claimed in claim 7 comprising a recharge chamber, a processing furnace having a peripheral wall, a front end wall and a rear end wall, said processing furnace being connected at its front end to said heat exchanger and at its rear end to said recharge chamber, in said processing furnace an inner wall attached to said rear end wall and spaced from said peripheral wall of said processing furnace so as to form between said walls a return feed space, means for transporting comminuted material from said recharge chamber to said return feed space, a passageway through said rear end wall from said return feed space to the interspace between the tubes in the heat exchanger at the most peripheral portions of said interspace and propelling means in said return feed space adapted to promote feed of the comminuted material from said return feed space into said interspace.

17. Apparatus as defined in claim 11 in which said processing furnace consists of a preheating chamber connected at one end to said heat exchanger and a processing chamber connected to the other end of said preheating chamber and a transverse wall partially separating said preheating chamber and said processing chamber.

18. Apparatus as defined in claim 8 comprising a processing furnace connected to said heat exchanger, the screw-shaped inserts of said propelling members being mounted on central pipes which establish gas communication between said furnace and said heat exchanger.

References Cited in the file of this patent

UNITED STATES PATENTS

| | | |
|---|---|---|
| 2,019,179 | Fasting | Oct. 29, 1935 |
| 2,026,441 | Shafter et al. | Dec. 31, 1935 |
| 2,036,578 | Keyes | Apr. 7, 1936 |
| 2,633,346 | Stein | Mar. 31, 1953 |
| 2,788,204 | Kalling et al. | Apr. 9, 1957 |